3,531,573
ANTIDEPRESSANT COMPOSITIONS AND METHODS USING α-ETHYLTRYPTAMINE
William C. Anthony, Kalamazoo Township, Kalamazoo County, Mich., assignor to The Upjohn Company, Kalamazoo, Mich., a corporation of Delaware
No Drawing. Continuation-in-part of applications Ser. No. 792,704, Feb. 12, 1959, and Ser. No. 68,677, Nov. 14, 1960. This application Aug. 4, 1964, Ser. No. 387,513
Int. Cl. A61u *27/00*
U.S. Cl. 424—274                         10 Claims

ABSTRACT OF THE DISCLOSURE

This invention relates to antidepressant compositions and, more particularly, to compositions containing α-ethyltryptamine or acid addition salts thereof as the primary active ingredient and to a method for using the same.

---

This application is a continuation-in-part of Ser. Nos. 792,704, filed Feb. 12, 1959, and 68,677, filed Nov. 14, 1960, both now abandoned.

The primary active ingredients of these compositions possess in common the structure:

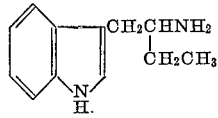

and include, in addition to the said basic amine, physiologically acceptable acid addition salts thereof such as the acetate, hydrochloride, pyruvate, sulfate, phosphate, citrate and tartrate. Reference to "α-ethyltryptamine" hereinafter includes the free base, the said acid addition salts thereof, unless otherwise indicated, and the d- and l-isomers and racemic mixtures of such compounds.

α-Ethyltryptamine hydrochloride was one of a number of compounds examined by Govier et al. (Science 118:596 [1953]) in his search for an orally active vasoconstrictor. Although concluding that certain of these compounds (not including α-ethyltryptamine hydrochloride) might be more active orally as vasoconstrictors than the remaining compounds, even as to such compounds the authors cautioned that the results might not hold on in vivo test. Thus no teaching of useful pharmacologic activity of any kind is provided for α-ethyltryptamine. Moreover, animal studies in connection with this invention indicated clearly that these compounds were true monamine oxidase inhibitors, but studies in man have since shown that this is not uniformly the case. It is now generally agreed that MAO inhibition is not the mechanism by which the remarkable antidepressant action is achieved in humans, although the precise mode of action has not been completely identified.

In extensive clinical studies on compositions containing a representative α-ethyltryptamine salt, both its clinical effectiveness and safety have been demonstrated in the treatment of mental depressions of the endogenous, organic, involutional and reactive types, as well as in undefined psychosomatic disorders characterized by a depressive phase. Significant success has also been obtained in treating angina pectoris, rheumatoid arthritis and other conditions.

In the clinical investigations conducted with α-ethyltryptamine acetate no evidence of liver toxicity has been observed, in contradistinction to experience with certain of the hydrazine compounds. An extremely low incidence of agranulocytosis has been associated with its use, but investigators have reported its safety generally to be one of its outstanding characteristics. Of particular importance clinically is the rapid reversibility of activity, effects being dissipated in 24–48 hours after cessation of therapy. This factor, coupled with the early onset of the desired psychic energization or mood enhancement which follows initiation of therapy, provides a high degree of positive control. Following is a summary of results obtained in the treatment of some of the clinical conditions in which the present compositions have proved significantly effective:

| Clinical condition | Investigators reporting | Number of patients | Percent benefit |
|---|---|---|---|
| Endogenous depression | 21 | 141 | 82 |
| Reactive depression | 12 | 47 | 74 |
| Unclassified depressions | 20 | 207 | 66 |
| Angina pectoris | 9 | 37 | 78 |
| Rheumatoid arthritis | 4 | 72 | 80–85 |

The pharmaceutical forms contemplated by this invention for carrying out the invention include pharmaceutical compositions suited for oral and injection use. The oral compositions include both solid and liquid forms. Solid compositions may be in the form of tablets, coated or uncoated; capsules, hard or soft; powders; granules; pills and the like. Suitable solid diluents or carriers for such compositions include lipids, carbohydrates, proteins and mineral solids. The liquid compositions can be in the form of emulsions, solutions, suspensions, syrups and elixirs.

The tablets contain the active ingredient in the required amount with pharmaceutical diluents or excipients, binders, disintegrators, and lubricants. The active ingredient is suitably comminuted with a carbohydrate diluent (e.g., starch and sucrose), a mineral solid (e.g., kaolin and dicalcium phosphate) and the like, to form the basic powder mixture. The said mixture can be granulated by wetting with a protein binder such as gelatin solution, or a carbohydrate such as acacia mucilage and corn syrup, and is then screened to desired particle sizes. As an alternative to granulating, the mixture can be slugged through the tablet machine and the slugs comminuted prior to formation of the tablets. A carbohydrate disintegrating agent (e.g., cornstarch) is advantageously added at the time of preparing the basic mixture. The lubricant, for example, a lipid (such as stearic acid, a stearate salt or mineral oil), a mineral solid (such as talc), and the like is used to prevent sticking of the mixture to the tablet-forming dies. The tablets can be coated or left uncoated. Suitable coatings include a sealing coat of shellac, a taste-disguising carbohydrate coating (such as sugar or methylcellulose), and a lipid polish coating such as carnauba wax. Special coatings can comprise (a) lipid-type coatings of a semi-permeable nature for delaying absorption of the active ingredient to provide sustained action or (b) enteric substances (such as styrene maleic acid copolymer and cellulose acetate phthalate) to resist release of the active ingredient in the stomach and permit release in the upper intestine.

The capsules for oral use can comprise a mixture of the active ingredient in combination with a pharmaceutical diluent and a gelatin sheath enclosing said mixture. The capsules can be in the form of soft capsules enclosing the active ingredient in the required amount with suitable diluents such as edible oils, or hard capsules comprising mineral solids (e.g., talc or calcium carbonate) and, optionally, lubricants( e.g., calcium or magnesium stearate salts).

The powders are conveniently prepared by comminuting the active ingredient and mixing with an acceptable diluent (e.g., an edible carbohydrate such as starch) and advantageously include sweetening and flavoring agents (such as sugar, saccharin, a cyclamate salt or flavoring oil).

Pills include the required amount of the active ingredient plus suitable diluents, binders, disintegrators and lubricants as heretofore set forth with respect to tablet and capsules. The pills are suitably prepared by the rolling technique or other known methods, advantageously with the use of the aforesaid lubricants.

The granules for oral use contain the required amount of the active ingredient admixed with a dispersing agent, e.g., naturally-occurring phosphatides, a condensation product of ethylene oxide with fatty acids or fatty alcohols, partial esters of fatty acids and a hexitol anhydride, and polyoxyethylene condensation products of the esters. Advantageously these compositions contain sweetening agents, such as sucrose, saccharin, cyclamate salts and the like, together with flavoring and coloring agents.

For the treatment of domestic birds and mammals by oral administration, the therapeutic ingredient is conveniently prepared in the form of a food premix. The food premix can comprise the active ingredient in admixture with an edible diluent such as starch, oatmeal, flour, calcium carbonate, talc, dried fish meal and like non-toxic, orally-acceptable diluents. The prepared premix is then conveniently added to the regular feed, thereby supplying the included medication to the animal or bird in the course of feeding.

As set forth above, the oral liquid compositions include emulsions, solutions and suspensions, especially in the form of syrups and elixirs. The emulsions are preferably of the oil-in-water type and contain the active ingredient in the required amount with acceptable emulsifying agents, such as gum acacia, gum tragacanth, naturally-occurring phosphatides, and the like. Suitable sweetening, coloring, and flavoring agents are added to the aqueous phase of the emulsion. Under ordinary conditions of storage and use, the emulsions are kept free from microorganism growth by the addition of a preservative, such as methylparaben and propylparaben. Ethanol in a concentration of 12 to 15% can be used as an auxiliary preservative.

Solutions of the active ingredient can be prepared in water or water suitably diluted with, e.g., ethanol, sorbitol, glycerin, edible polyols (such as propylene glycol), and the like. As with emulsions, under ordinary conditions of storage and use the solutions likewise contain a preservative to prevent the growth of microorganisms. Sweetening, coloring, and flavoring agents are added to assure patient acceptance.

Suspensions of insoluble forms of the active ingredients are conveniently prepared in water and aqueous solutions of orally acceptable liquids, such as those comprising the solutions above. The active ingredient is normally comminuted to a fine particle size for use in the suspensions, which can also contain soluble suspending agents, such as methylcellulose, acacia, tragacanth, polyvinylpyrrolidone, polyvinyl alcohol, and the like. As with the other liquid oral composition preservatives, coloring agents, sweeteners and flavoring agents are added for convenience in storage and use.

Syrups contain the active ingredient in the required amount in an aqueous solution containing a sweetening agent, such as sugar, saccharin, or cyclamate salts. Colors, flavors and preservatives are again added to facilitate storage and use. The elixirs contain the active ingredient in the required amount in a hydro-alcoholic solution. Sweeteners, colors, flavors and preservatives are also added as before.

As stated above, the pharmaceutical compositions also can be in forms suited for injection use, which forms include sterile aqueous solutions or suspensions and sterile powders for the extemporaneous preparation of sterile injectable solutions or suspensions. Regardless of the particular form of a given product, certain basic requirements exist. For example, in all cases the product must be sterile and must be fluid to facilitate syringeability. It must be stable under the conditions of manufacture and storage and must be preserved against the contaminating action of bacteria and fungi. The basic solvent or suspending liquid comprises water, vegetable oils, ethanol, polyols (e.g., glycerol, propylene glycol, liquid polyethylene glycol or the like), or suitable mixtures thereof. The proper fluidity can be maintained by the use of a coating such as lecithin, by the maintenance of the required particle size in the case of suspensions, or by the use of surfactants (e.g., a condensation product of ethylene oxide with fatty acids or fatty alcohols, partial esters of fatty acids and a hexitol anhydride, and polyoxyethylene condensation products of the esters) and suspending agents (e.g., gelatin, polyvinylpyrrolidone and sodium carboxymethylcellulose). In the case of sterile powders solid polyethylene glycol can be used. Stability is maintained by control of pH through the use of buffers and stabilizers (e.g., antioxidants such as bisulfites and metabisulfites). Contamination by microorganisms can be avoided by use of various agents, such as the parabens, chlorobutanol, benzyl alcohol, phenol, sorbic acid, thimerosal, and the like. In many cases it is preferable to include isotonic agents such as sugars or salts to minimize discomfort at the injection site. Prolonged absorption of the injectable compositions from the injection site can be brought about by the incorporation of agents delaying absorption, such as aluminum monostearate and gelatin.

Sterile injectable solutions are prepared by incorporating the required amount of active ingredient in the appropriate solvent with various of the other ingredients enumerated above, as appropriate, followed by heating to sterilizing temperatures or by filter sterilizing. Generally, suspensions are prepared by incorporating the previously sterilized active ingredient into a sterile vehicle comprising the basic suspending liquid and the other ingredients as numerated above.

In the preparation of sterile powders for use in sterile injectable solutions, the preferred method involves freeze-drying of a previously sterilized solution of the active ingredient plus any additional desired soluble ingredients to obtain a sterile, dry product. Powders for injectable suspensions are preferably sterilized by the use of a gas, such as ethylene oxide, and subsequently incorporated, with the required additional ingredients and in the proper particle size, into the basic powder for later reconstitution in the desired sterile suspending liquid.

The term dosage unit form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, capsules, pills, powder or granule packets, wafers, cachets, vials, teaspoonfuls, tablespoonfuls, dropperfuls, segregated multiples of any of the foregoing, and other forms as herein described.

The dosage of $\alpha$-ethyltryptamine, dispersed in a pharmaceutically and physiologically acceptable carrier for oral or parenteral administration, ranges from about 5 to about 300 mg. in a single dose or in divided doses given two to four times daily. A total daily amount of about 10 to about 75 mg. given as a single daily dose or in divided doses two to four times daily is preferred. In all instances, however, the exact dosage must be determined individually in light of the patient's age, weight, physical condition, the severity of the condition being treated and the route of administration employed.

In veterinary practice the present compositions can be used to elicit psychic energization in animals, as, for example, where the depression is associated with disease. In dogs and cats the dose is from about one-fourth to the full amount of the human dose; in horses the dose is from about five to ten times the human dose. Other animals should receive amounts adjusted accordingly in terms of weight. The compositions are suitably administered orally in the form of tablets or boluses or by injection as a solution or suspension.

To obtain a combination of pharmacologic effects, compositions containing α-ethyltryptamine in combination with pharmacologically significant amounts of complementing ingredients can be given. For example, an oral unit dosage form of an effective combination product comprises from about 5 to about 60 mg. of α-ethyltryptamine with one or more of the following ingredients in approximately the indicated amounts: reserpine (0.25–1 mg.); methaminodiazepoxide (5–20 mg.); 5 - hydroxytryptophan (50–300 mg.); phenobarbital or butabarbital (8–60 mg.) or amobarbital (16–120 mg.); iproniazid (15–50 mg.); phenothiazines such as chlorpromazine hydrochloride (10–50 mg.); meprobamate (100–400 mg.); dl - monobasic amphetamine phosphate (2–10 mg.); ectylurea (150–300 mg.); N - (3,3 - diphenylpropyl) - α - methylphenethylamine (15–45 mg.); antiarthritic agents such as methylprednisolone (0.5–10 mg.), hydrocortisone (5–25 mg.), and prednisolone or prednisone (0.5–15 mg.); analgetic agents such as aspirin (150–600 mg.), phenacetin (150–600 mg.), or N - acetyl - p - aminophenol (150–600 mg.); combinations of antiarthritics and analgetics as indicated above; progestational agents such as medroxyprogesterone (2.5–10 mg.) or hydroxyprogesterone acetate (25–50 mg.); diuretics such as ethoxzolamide (50–150 mg.) or chlorthiazide (250–500 mg.). Methods for preparing these combination products follow conventional procedures as represented below.

In the preferred embodiment of this invention a unit dosage form can contain α-ethyltryptamine acetate in amounts of from about 10 to about 75 mg. per dosage unit, 15 mg. per dosage unit representing a particularly convenient amount, in combination with a solid pharmaceutical carrier as hereinbefore described for oral administration.

The active ingredient can likewise be compounded with an oral liquid pharmaceutical carrier in concentrations suitable for subdividing to dosage unit forms for convenient and effective oral administration. Suitable concentrations provide from about 1 to about 25 mg. per ml. Thus a teaspoonful (approximately 5 ml.) or a dropperful (approximately 0.6 ml.) provide suitable single doses for unitary administration. The preferred dosage unit for oral administration in liquid form is a teaspoonful, and suitable concentrations for such a dosage unit range from about 1 to about 12 mg. per ml., about 2 mg. per ml. representing a preferred concentration. For injection intravenously or intramuscularly, a sterile aqueous preparation of from about 5 to about 60 mg. per ml. is useful, about 30 mg. per ml. being preferred.

The preparation of α-ethyltryptamine and its acetate has been described by Snyder and Katz, J. Am. Chem. Soc. 69:3140 (1947). Other acid addition salts such as the hydrochloride, pyruvate, sulfate, phosphate, citrate, tartrate and the like are prepared in the usual manner by contacting the free base with the appropriate acid. The product obtained above is a racemic mixture of d- and l-isomers which can be separated if desired. Resolution can be accomplished, for example, by the following procedure:

1-α-Ethyltryptamine acetate

A mixture of 51.8 gm. of α-ethyltryptamine and 79.8 gm. of d-camphorsulfonic acid was dissolved in 840 ml. of boiling isopropanol and decanted from insoluble impurities. The solution was allowed to come to room temperature overnight and filtered. The solid was washed with 140 ml. of isopropanol followed by ether to yield 82.9 gm. of solid. The solid was recrystallized successively from 1400, 1200, and 700 ml. of isopropanol to yield 24.7 gm. of solid; $[\alpha]_D$ —9° ($H_2O$). A 20.0 gm. portion of the salt was dissolved with stirring in 1200 ml. of water and then 1.5 eq. of sodium hydroxide in water was added dropwise over 1 hour and filtered. The solid was washed well with water and dried to yield 8.6 gm. of the free 1-isomer. A sample was mixed into ether, dried over potassium carbonate and concentrated to yield a white solid $[\alpha]_D$ —52° (alc.). The total quantity of amine was dissolved in 50 ml. of methanol, and 3.5 ml. of acetic acid was added. The solution was concentrated to dryness under reduced pressure. The residue was recrystallized from 75 ml. of methanol and 300 ml. of ethyl acetate to yield 6.8 gm. of 1-α-ethyltryptamine acetate; $[\alpha]_D$ —39° ($H_2O$); M.P. (corr.) 170.7–173.4° C.

Analysis.—Calc'd for $C_{14}H_{20}N_2O_2$ (percent): C, 67.71; H, 8.12; N, 11.28. Neutral equivalent, 248. Found (percent): C, 68.01; H, 8.48; N, 11.38. Neutral equivalent, 244.

d-α-Ethyltryptamine acetate

The original filtrate and the filtrates from the three recrystallizations above were combined and concentrated to dryness under reduced pressure. The residue was recrystallized from 200 ml. of isopropanol to yield 49.5 gm. of solid. The solid was recrystallized successively from 400, 400, and 300 ml. of isopropanol to yield 21.0 gm. of salt; $[\alpha]_D$ +250° ($H_2O$). The filtrate was concentrated to 100 ml., treated with Nuchar 190-N (activated carbon) and allowed to cool to yield 12.5 gm. of salt; $[\alpha]_D$ +19°. The solids were combined and recrystallized successively from 250, 150, and 150 ml. of isopropanol to yield 16.9 gm. of salt; $[\alpha]_D$ +19°. A 15 gm. quantity of the salt was converted to the free base as above and recrystallized three time from ethyl acetate to yield 2.0 gm. of d-α-ethyltryptamine; $[\alpha]_D$ +52°. The acetate salt was prepared as above, giving d-α-ethyltryptamine acetate, $[\alpha]_D$ +37° ($H_2O$); M.P. (corr.) 170–172.1° C.

Analysis.—Calc'd for $C_{14}H_{20}N_2O_2$ (percent): C, 67.71; H, 8.12; N, 11.28. Neutral equivalent, 248. Found (percent): C, 67.53; H, 8.09; N, 11.37. Neutral equivalent, 244.

The examples which follow illustrate the best mode contemplated by the inventor for carrying out this invention, but such examples are not to be construed as limiting the scope thereof.

EXAMPLE 1.—Tablets

Ten thousand tablets for oral use, each containing 15 mg. of α-ethyltryptamine acetate, are prepared from the following types and amounts of materials:

| | Gm. |
|---|---|
| α-Ethyltryptamine acetate | 150 |
| Lactose, U.S.P. | 1225 |
| Sucrose, powdered, U.S.P. | 1225 |
| Cornstarch, U.S.P. | 300 |

The finely powdered materials are mixed well and the mixture granulated with 10% starch paste. The wet mass is forced through an 8-mesh screen, dried at 110° F. in a forced-air oven and then put through a 12-mesh screen. As lubricant, 30 gm. of magnesium stearate is added before compressing into tablets. The tablets are effective in treating mild depressive states in adults when administered in dosages of one to two tablets one to four times per day.

Substituting 50 gm. of α-ethyltryptamine acetate for the 150 gm. in the above formulation gives tablets each containing 5 mg. of active ingredient. These tablets are administered on a schedule of one tablet two to four times daily in the treatment of depression.

EXAMPLE 2.—Capsules (hard-filled)

Ten thousand two-piece hard gelatin capsules for oral use, each containing 75 mg. of α-ethyltryptamine hydrochloride, are prepared from the following types and amounts of materials:

| | Gm. |
|---|---|
| α-Ethyltryptamine hydrochloride | 750 |
| Cornstarch, U.S.P. | 1875 |
| Light mineral oil, U.S.P. | 130 |
| Magnesium stearate, powder | 160 |
| Talc, U.S.P. | 160 |

The finely powdered ingredients are mixed thoroughly and then capsulated in the usual manner.

Similarly, 10,000 capsules, each containing 300 mg. of α-ethyltryptamine acetate, are prepared by substituting for the 750 gm. of α-ethyltryptamine hydrochloride in the above formula 3000 gm. of α-ethyltryptamine acetate.

The foregoing capsules find application in the treatment of patients exhibiting mental disease characterized by moderate and severe depressive states. A suitable dosage is one 75 mg. capsule given two times daily or one 300 mg. capsule given once daily.

EXAMPLE 3.—Syrup

An aqueous preparation for oral use, each 5 ml. containing 2.0 mg. of α-ethyltryptamine, is prepared from the following types and amounts of materials:

α-Ethyltryptamine, micronized—4 gm.
Benzoic acid, U.S.P.—10 gm.
Methylparaben, U.S.P.—20 gm.
Propylparaben, U.S.P.—5 gm.
Glycerin, U.S.P.—1500 ml.
Tragacanth powder, U.S.P.—75 gm.
Oil of orange—2 ml.
Sucrose, U.S.P.—4000 gm.
F.D.C. orange dye—20 gm.
Deionized water, q.s. to 10,000 ml.

The benzoic acid and parabens are added to the glycerin in a separate container, followed by the finely powdered α-ethyltryptamine, tragacanth, color and flavor in the order named. This is mixed until a uniform suspension is obtained and then added to 5000 ml. of water with rapid stirring. Finally, the sugar is added and the whole mixed thoroughly by processing through a colloid mill. Sufficient water is added to bring the total volume to 10,000 ml.

The foregoing suspension is useful in treating mild depressive states on a dosage of one teaspoonful four times daily.

EXAMPLE 4.—Capsules (soft elastic)

One-piece soft elastic gelatin capsules for oral use, each containing 10 mg. of α-ethyltryptamine, are prepared by first dispersing the base in sufficient corn oil to render the material capsulatable and then capsulating in the usual manner.

The above capsules given on a dosage of one capsule four times daily are employed in the treatment of mild depression.

EXAMPLE 5.—Elixir

An elixir for oral use, each 5 ml. containing 20 mg. of α-ethyltryptamine sulfate, is prepared by thoroughly mixing together the following materials:

α-Ethyltryptamine sulfate—40 gm.
Saccharin sodium—125 gm.
Cyclamate sodium (sodium cyclohexylsulfamate)—25 gm.
Sucrose—3000 gm.
Ethanol 95%—1500 ml.
Propylene glycol—1000 ml.
F.D.C. yellow dye—10 gm.
Lemon flavor—20 gm.
Deionized water, q.s. to 10,000 ml.

The above elixir is administered on a dosage schedule of one teaspoonful three times daily for treatment of moderate depressive states.

EXAMPLE 6.—Injectable solution

A sterile aqueous preparation suitable for intramuscular injection and containing 2.5 mg. of α-ethyltryptamine tartrate in each milliliter is prepared from the following types and amounts of materials:

α-Ethyltryptamine tartrate—2.5 gm.
Chlorobutanol—3 gm.
Water for injection, q.s. to 1000 ml.

Administration of the above preparation on a dosage schedule of 1 ml. three or four times daily is useful in the treatment of moderate depression.

Substituting 30 gm. of α-ethyltryptamine acetate for the active ingredient above is productive of an aqueous solution for intravenous or intramuscular injection containing 30 mg. per ml. of α-ethyltryptamine acetate, which is administered on a schedule of 1 ml. daily.

EXAMPLE 7.—Tablets

One thousand tablets for oral use, each containing 5 mg. of α-ethyltryptamine acetate and 15 mg. of N-(3,3-diphenylpropyl)-α-methylphenethylamine lactate, are prepared from the following materials:

| | Gm. |
|---|---|
| α-Ethyltryptamine acetate | 5 |
| N - (3,3-diphenylpropyl - α - methylphenethylamine lactate | 15 |
| Lactose | 125 |
| Cornstarch | 65 |
| Magnesium stearate | 25 |
| Light liquid petrolatum | 3 |

The ingredients are thoroughly mixed and slugged. The slugs are broken down by forcing through a No. 16 screen. The resulting granules are then compressed into tablets.

The foregoing tablets are useful for treatment of angina by oral administration of one tablet three or four times daily.

Using the above procedure but substituting 45 gm. for the 5 gm. of N-(3,3-diphenylpropyl)-α-methylphenethylamine lactate gives tablets containing 5 mg. of α-ethyltryptamine acetate and 45 mg. of N-(3,3-diphenylpropyl)-α-methylphenethylamine lactate. These tablets are administered on a schedule of one tablet three times daily for severe angina.

In the foregoing Examples 1 through 7, "α-ethyltryptamine" refers to the racemic mixture of the free base or the indicated acid addition salt. Similarly, in each of said Examples 1 through 7 either the d- or l-form, substantially free of the other isomer, can be substituted for the racemate to give compositions which can be administered on the same dosage schedule and for the same clinical indications as stated.

What is claimed is:

1. A therapeutic composition comprising: as the primary active ingredient, from about 5 to about 300 mg. of a compound selected from the group consisting of α-ethyltryptamine and physiologically acceptable acid addition salts thereof, dispersed in a pharmaceutical carrier.

2. A therapeutic composition comprising: in solid unit dosage form, as the primary active ingredient, from about 10 to about 75 mg. of α-ethyltryptamine acetate, dispersed in a solid pharmaceutical carrier.

3. A liquid pharmaceutical composition for oral use comprising: as the primary active ingredient, from about 1 to about 25 mg. per ml. of α-ethyltryptamine acetate, dispersed in a sweetened and flavored liquid pharmaceutical vehicle.

4. A liquid pharmaceutical composition for injection use comprising: as the principal active ingredient, from about 5 to about 60 mg. per ml. of α-ethyltryptamine acetate, dispersed in a sterile aqueous vehicle.

5. A therapeutic composition comprising: as the primary active ingredient, from about 10 to about 75 mg. of a compound selected from the group consisting of d-α-ethyltryptamine and the physiologically acceptable acid addition salts thereof, substantially free of the l-isomer, dispersed in a pharmaceutical carrier.

6. A therapeutic composition comprising: as the primary active ingredient, from about 10 to about 75 mg. of a compound selected from the group consisting of l-α-ethyltryptamine and the physiologically acceptable acid additions salts thereof, substantially free of the d-isomer, dispersed in a pharmaceutical carrier.

7. A method for treating mental depression which comprises: administering, in unit dosage form, a composition containing from about 5 to about 300 mg. of a compound selected from the group consisting of α-ethyltryptamine and the physiologically acceptable acid addition salts thereof, dispersed in a pharmaceutical carrier to a depressed subject.

8. A method for treating mental depression which comprises: administering, in unit dosage form, a composition containing from about 10 to about 75 mg. of α-ethyltryptamine acetate, dispersed in a pharmaceutical carrier to a depressed subject.

9. A method for treating mental depression which comprises: administering, in unit dosage form, a composition containing from about 10 to about 75 mg. of a compound selected from the group consisting of d-α-ethyltryptamine and physiologically acceptable acid addition salts thereof, substantially free of the l-isomer, dispersed in a pharmaceutical carrier to a depressed subject.

10. A method for treating mental depression which comprises: administering, in unit dosage form, a composition containing from about 10 to about 75 mg. of a compound selected from the group consisting of l-α-ethyltryptamine and physiologically acceptable acid addition salts thereof, substantially free of the d-isomer, dispersed in a pharmaceutical carrier to a depressed subject.

References Cited

FOREIGN PATENTS 807,076   1/1959   Great Britain.

OTHER REFERENCES

Govier et al., Chem. Abst. vol. 48, p. 2794(f), 1954, citing Science, vol. 113, Nov. 13, 1953, pp. 596–597.

Drug Trade News, Mfg. Sec., Jan. 13, 1958, p. 53.

Snyder et al., J. Am. Chem. Soc., vol. 69, pp. 3140–3142.

Zeller et al., Experientia, 15 IX, 1952, pp. 349–350.

Shore et al., Science, vol. 126, November 1957, pp. 1063–1064.

Karsen, Organic Chemistry, 2nd edition, pp. 92–102, 1946.

New York Times, U.S. Bans Sales of Drug Monase, Mar. 21, 1962, p. 25, cols. 5–6.

Ayima, Am. J. of Psychiatry, vol. 117, No. 11, p. 1092, May 1961.

Washington Daily News, Four Drugs Have Been Taken Off the Market, p. 9, Apr. 16, 1962.

STANLEY J. FRIEDMAN, Primary Examiner

U.S. Cl. X.R.

260—319

UNITED STATES PATENT OFFICE
CERTIFICATE OF CORRECTION

Patent No. 3,531,573          Dated September 29, 1970

Inventor(s)    William C. Anthony

It is certified that error appears in the above-identified patent and that said Letters Patent are hereby corrected as shown below:

Column 6, line 30, for "+250°" read -- +25° --.

Column 10, line 21, for "Karsen" read -- Karrer --.

Signed and sealed this 13th day of April 1971.

(SEAL)
Attest:

EDWARD M. FLETCHER, JR.          WILLIAM E. SCHUYLER, JR.
Attesting Officer                Commissioner of Patents